(12) United States Patent
McConkey et al.

(10) Patent No.: US 7,780,185 B2
(45) Date of Patent: Aug. 24, 2010

(54) FOLDABLE FRAME TRAILER CART

(76) Inventors: Gordon McConkey, 190274 C.R.J., Scottsbluff, NE (US) 69361; Justin McConkey, 290 NW. 12th St., Cedaredge, CO (US) 81413

( * ) Notice: Subject to any disclaimer, the term of this patent is extended or adjusted under 35 U.S.C. 154(b) by 190 days.

(21) Appl. No.: 12/002,907

(22) Filed: Dec. 19, 2007

(65) Prior Publication Data
US 2008/0157493 A1    Jul. 3, 2008

Related U.S. Application Data

(60) Provisional application No. 60/877,524, filed on Dec. 28, 2006.

(51) Int. Cl.
*B62B 1/02*    (2006.01)
(52) U.S. Cl. ......................... 280/656; 280/30
(58) Field of Classification Search .................. 280/30, 280/32.7, 35, 43, 415.1, 489, 492, 638, 639, 280/656, 762, 769; 224/519, 520, 521
See application file for complete search history.

(56) References Cited

U.S. PATENT DOCUMENTS

| | | | | |
|---|---|---|---|---|
| 4,958,846 A | * | 9/1990 | Greenberg | 280/652 |
| 5,373,708 A | * | 12/1994 | Dumoulin, Jr. | 62/457.7 |
| 6,254,117 B1 | * | 7/2001 | Cross | 280/401 |
| 7,055,848 B1 | * | 6/2006 | James | 280/656 |
| 7,401,804 B1 | * | 7/2008 | Rupp | 280/656 |
| 7,458,597 B2 | * | 12/2008 | MacDougall | 280/491.1 |
| 2004/0032114 A1 | * | 2/2004 | Hagen | 280/656 |
| 2005/0184485 A1 | * | 8/2005 | Timmermans | 280/656 |
| 2006/0038384 A1 | * | 2/2006 | Cumbie | 280/656 |
| 2006/0279071 A1 | * | 12/2006 | Spainhower | 280/656 |
| 2007/0235985 A1 | * | 10/2007 | Thompson | 280/656 |

* cited by examiner

*Primary Examiner*—Lesley Morris
*Assistant Examiner*—Brodie Follman
(74) *Attorney, Agent, or Firm*—Stinson Morrison Hecker LLP

(57) ABSTRACT

An improved foldable frame trailer cart includes a generally rectangular base frame having forward and rearward sections hingedly connected to one another and a trailer tongue mounted on and extending forwardly from the forward section of the generally rectangular base frame, the trailer tongue including a hinge operative to permit the rear portion of the trailer tongue to be pivoted relative to the front portion thereof. Left and right rear wheels are rotatably mounted within left and right wheel support frames, and the left and right wheel support frames are releasably pivotably mounted on the rearward section of the generally rectangular base frame such that the left and right wheel support frames are pivotable relative to the generally rectangular base frame between a non-ground-engaging transport position and a ground-engaging use position.

16 Claims, 3 Drawing Sheets

FOLDABLE FRAME TRAILER CART

CROSS-REFERENCE TO RELATED PATENTS

This application claims priority based on a provisional patent, specifically on the Provisional Patent Application Ser. No. 60/877,524 filed Dec. 28, 2006.

BACKGROUND OF THE INVENTION

1. Technical Field

The present invention relates generally to towable carts or trailers and, more particularly, to a foldable frame trailer cart which includes a generally rectangular frame having forward and rearward sections hingedly connected to one another, a hinged trailer tongue extending forwardly from the forward section of the generally rectangular frame and left and right rear wheels which are rotatably mounted in left and right wheel support frames which in turn are pivotally mounted on the rear of the rearward section of the generally rectangular frame to permit the wheel support frames to pivot relative to the generally rectangular frame for transport and storage of the trailer once it is folded and for permitting the generally rectangular frame to be lowered to ground level for loading and unloading of the generally rectangular frame.

2. Description of the Prior Art

There has been an exponential increase in the number of personal recreation vehicles such as all-terrain vehicles being used for all sorts of purposes, from recreational to commercial, and from light duty to heavy duty. One of the reasons for this significant increase is that ATVs provide the operator with a degree of freedom not ordinarily available with regular-sized automobiles and trucks, specifically that the ATV may access areas which would be impossible to reach using conventional vehicles such as automobiles. One of the significant disadvantages, however, of the ATV is that the relatively small size of the ATV also means that there is few areas to carry or store other items, such as backpacks, camping gear, or other such outdoor accessories. The problem is further exacerbated when the ATV user is attempting to bring something back out of a generally inaccessible location, such as if the individual were hunting, fishing, or prospecting and he or she needs to transport a large animal such as a deer or transport a significant quantity of rocks, logs, or other such materials. There is therefore a significant need for an easy-to-use trailer or cart which can attach to the ATV and provide additional storage and carrying area for the ATV user.

Even should such a trailer or cart be provided, however, another problem could arise in that there are many situations where the towing of the trailer or cart is not the preferred method of transporting the trailer or cart. For example, it may be desirable to transport the ATV to the use location in a truck or the like instead of driving it to the use location, and in that situation is necessary to transport the trailer or cart without towing the trailer or cart behind the ATV. There is therefore a further need for a trailer or cart which may be folded to a storage and/or transport position for transport via a pickup truck or the like, yet which may be quickly and easily unfolded to its initial configuration for use as a trailer or cart when towed behind an ATV or other such vehicle.

Therefore, an object of the present invention is to provide an improved foldable frame trailer cart.

Another object of the present invention is to provide an improved foldable frame trailer cart which includes a base frame on which are pivotably mounted wheel support frames which pivot relative to the base frame between a use position and a transport position.

Another object of the present invention is to provide an improved foldable frame trailer cart which can be safely and efficiently carried in a transport position on a vehicle and which may then be quickly unfolded into a use position for carrying objects thereon to be towed on the trailer cart.

Another object of the present invention is to provide an improved foldable frame trailer cart in which the pivotably mounted wheel support frames also are usable to lower the base frame to the ground for easier loading of objects onto the base frame.

Finally, an object of the present invention is to provide an improved foldable frame trailer cart which is relatively simple and durable in construction and is safe, efficient and effective in use.

SUMMARY OF THE INVENTION

The present invention provides an improved foldable frame trailer cart including a generally rectangular base frame having forward and rearward sections hingedly connected to one another and a trailer tongue mounted on and extending forwardly from the forward section of the generally rectangular base frame, the trailer tongue including a hinge operative to permit the rear portion of the trailer tongue to be pivoted relative to the front portion thereof. Left and right rear wheels are rotatably mounted within left and right wheel support frames, and the left and right wheel support frames are releasably pivotably mounted on the rearward section of the generally rectangular base frame such that the left and right wheel support frames are pivotable relative to the generally rectangular base frame between a transport position and a use position.

The present invention thus provides numerous advantages over the prior art. For example, because the present invention is constructed of a lightweight yet strong construction material such as aluminum, the trailer cart can be folded in half at the midpoint of the frame and then the tongue can be folded such that the entire trailer cart can be carried on the trailer hitch without the trailer rolling over the ground, which is very important in situations where the trailer cannot travel over the ground surface yet the towing vehicle is able to do so. Furthermore, because the hinged connections are securable in their folded or extended positions, transport or use of the trailer cart is safe and secure regardless of the selected configuration of the trailer cart. Finally, the present invention is specifically designed for use with ATVs and other such personal transport vehicles, and presently there are few if any usable and transportable trailers in the prior art which are designed for such use, and therefore these features render the present invention a substantial improvement over the prior art.

DESCRIPTION OF THE PREFERRED EMBODIMENT

Figure 1:
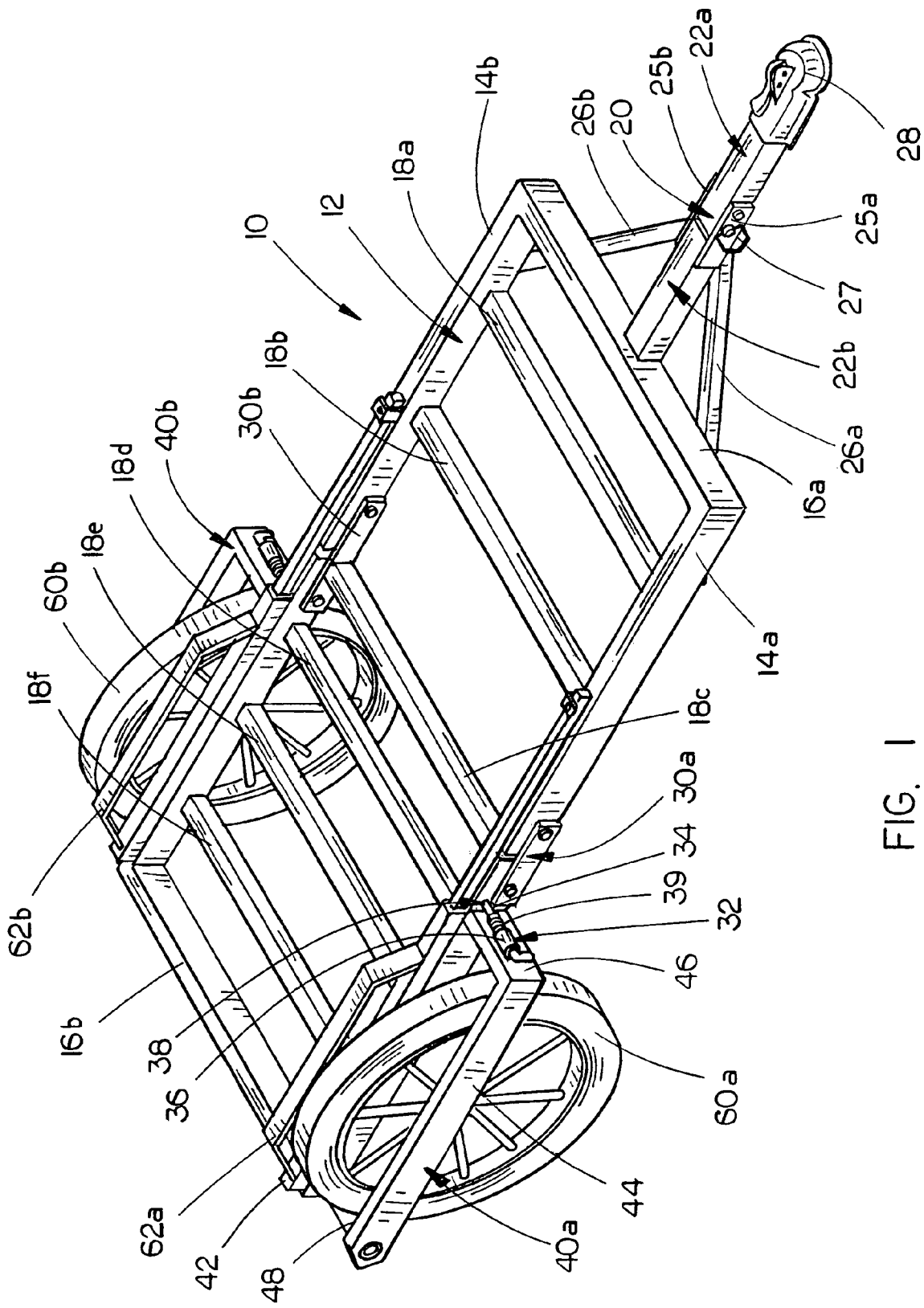
FIG. 1 is a perspective view of the foldable frame trailer cart of the present invention.
Figure 2:
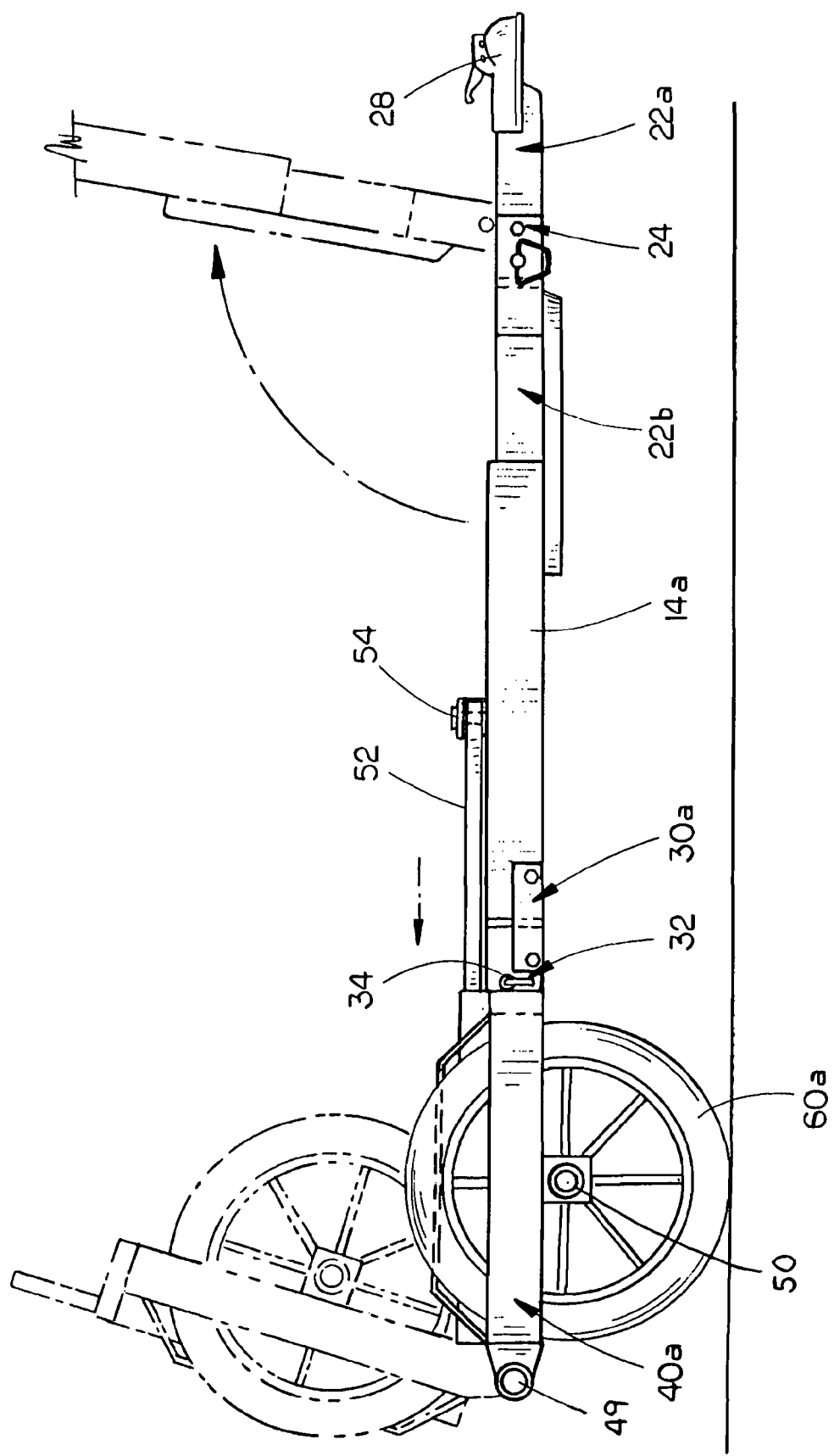
FIG. 2 is a side elevational view of the trailer cart showing the wheels and frame being folded for transport and/or storage of the trailer cart.
Figure 3:
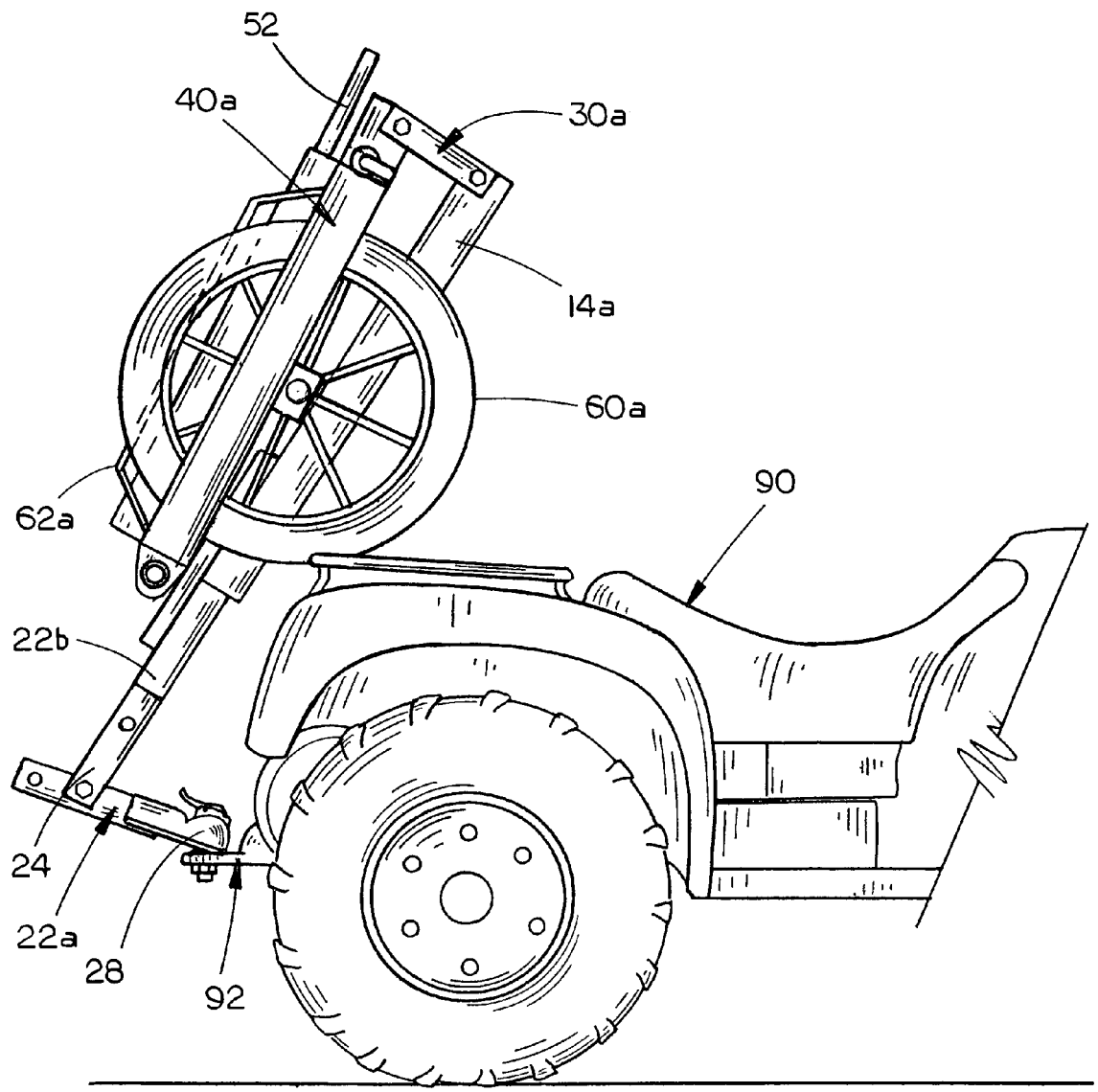
FIG. 3 is a detailed side elevational view of the present invention in folded transport position mounted on the rear of an ATV.

The foldable frame trailer cart 10 of the present invention is shown best in FIGS. 1-3 as including a generally rectangular base frame 12 which includes left and right longitudinal frame beams 14a and 14b and front and rear transverse frame beams 16a and 16b with a plurality of cross frame beams 18a, 18b, 18c, 18d, 18e and 18f extending transversely between the left and right longitudinal frame beams 14a and 14b to provide structural support for the generally rectangular base frame 12 and further to provide support for objects being carried on the base frame 12 which would otherwise fall through the base frame 12. In the preferred embodiment, the entire base frame 12 would be constructed of a lightweight aluminum material in order to significantly reduce the weight of the base frame 12, although it may be determined that use of composite-type construction materials will provide sufficient structural strength for the base frame 12 while also rendering construction of the frame 12 even easier. However, at the present time, such composite materials are far more expensive than aluminum, and therefore it is preferred that aluminum tubing of the rectangular type for the longitudinal frame beams 14a and 14b and transverse frame beams 16a and 16b and square tubing for the cross frame beams 18a-f would be used to construct the base frame 12. Additionally, in the preferred embodiment, the overall size of the base frame 12 would be approximately sixty to eighty-four inches in length and twenty-four to forty-eight inches in width, although such dimensions are not particularly critical to the present invention so long as the intended functional features are generally maintained.

Extending forwards from the front transverse frame beam 16a is a trailer tongue 20 which, in the preferred embodiment, will be constructed of similar rectangular aluminum tubing as used to construct the longitudinal and transverse frame beams 14a, 14b, 16a and 16b, with the trailer tongue 20 having a length of approximately twenty-four to thirty-six inches. Diagonal support struts 26a and 26b would preferably be included as extending from the outer portion of the generally rectangular base frame 12 forwards to the trailer tongue 20, as shown best in FIG. 1, in order to provide additional structural strength to the trailer tongue 20, as it has been found that lack of such structural strengthening will result in excessive forces being concentrated on the connection of the trailer tongue 20 to the front transverse frame beam 16a, which may result in an unsafe situation. It is further preferred that trailer tongue 20 be separated into a forward section 22a and a rearward section 22b, with the connection between the forward and rearward sections 22a and 22b being a releasable plate hinge 24. Finally, mounted on the forward part of front section 22a of trailer tongue 20 would be a standard ball hitch connector 28 which permits connection of the trailer tongue 20 to a selected ball hitch. It should be noted that the releasable plate hinge 24 described in connection with trailer tongue 20 would preferably be a pair of metal plates affixed to the trailer tongue 20 on the opposite sides thereof adjacent the connection between front and rear sections 22a and 22b of trailer tongue 20, with the plates 25a and 25b being pivotably connected to trailer tongue 20 with a securement pin 27 extending between and connecting the plates 25a and 25b to secure the trailer tongue 20 in the position shown in FIGS. 1 and 2.

Similar to the configuration described in connection with releasable plate hinge 24 on trailer tongue 20, a pair of releasable frame hinges 30a and 30b are provided on each of the left and right longitudinal frame beams 14a and 14b at approximately the midpoint of the generally rectangular base frame 12, as shown best in FIGS. 1 and 2. The releasable frame hinges 30a and 30b permit the base frame 12 to fold in half as will described later in this disclosure, and further it should be noted that the design of frame hinges 30a and 30b is not particularly critical to the present invention so long as the left and right longitudinal frame beams 14a and 14b are allowed to fold in half and the releasable frame hinges 30a and 30b cooperate to secure the generally rectangular base frame 12 in its open position, as shown in FIG. 1, when releasable frame hinges 30a and 30b are prevented from opening.

Pivotably mounted on the rear of generally rectangular base frame 12 are left and right wheel support frames 40a and 40b which each rotatably support a respective wheel 60a and 60b, as shown best in FIGS. 1 and 2. As the wheel support frames 40a and 40b function and are constructed in a generally identical manner, it should be understood that the following description of the support frame 40a should be understood to apply equally to rear support frame 40b. Wheel support frame 40a preferably includes inner and outer longitudinal frame beams 42 and 44, a front transverse frame beam 46, and a rear frame pivot axle beam 48 which extends between and connects the inner and outer frame beams 42 and 44 adjacent the rear ends thereof and further includes a rear frame pivot axle 49 which extends between and connects the rear frame pivot axle beam 48 and the generally rectangular base frame 12, specifically through rear transverse frame beam 16b, as shown best in FIG. 2. Wheel 60a is rotatably mounted on the inner and outer longitudinal frame beams 42 and 44 via wheel axle 50, and in the preferred embodiment the wheels 60a and 60b would be mounted on seventeen inch rims mounted on wheel axle 50 which would have a transverse length of approximately eight inches.

To releasably secure wheel support frame 40a in its use position, as shown best in FIGS. 1 and 2, a spring-loaded pin securement device 32 would be mounted on the front transverse frame beam 46 extending generally parallel therewith, the pin securement device 32 including a securement pin 34 slidably mounted on a pin support bracket 36 mounted on the front transverse frame beam 46, the securement pin 34 operative to slide into a pin-receiving hole 38 formed in the left longitudinal frame beam 14a. When the securement pin 34 is slid into the pin-receiving hole 38 formed in the left longitudinal frame beam 14a, the wheel support frame 40a would be releasably secured in its use position, as shown in FIG. 1. In the preferred embodiment, a tensioning spring 39 would be operatively connected to the securement pin 34 to bias the securement pin towards the pin-receiving hole 38 formed in the left longitudinal frame beam 14a to generally prevent unintentional separation of the securement pin 34 from the pin-receiving hole 38. In this manner, the wheel support frame 40a is safely and securely retained in its use position until such time as the wheel support frame 40a will be moved to the storage or transport position.

For swinging the wheel support frame 40a into its use position as shown in FIG. 1, a wheel support frame pivot lever 52 would be slidably mounted within and extend forwardly from inner frame beam 42, the wheel support frame pivot lever 52 being designed to slide out of the inner frame beam 42 and to align generally parallel with the right longitudinal frame beam 14a and rest on top of that frame beam 14a while extending over the releasable frame hinge 30a, as shown best in FIGS. 1 and 2. In the preferred embodiment, the wheel support frame pivot lever 52 would be releasably secured underneath an arm securement bracket 54 which is mounted on right longitudinal frame beam 14a forwardly of the releasable frame hinge 30a. Securement of the wheel support frame pivot lever 52 by arm securement bracket 54 thus not only secures the wheel support frame 40a in its use position, but simultaneously provides additional structural rigidity to the base frame 12 as the wheel support frame pivot lever 52 extends across the releasable frame hinge 30a, as shown best in FIGS. 1 and 2. Therefore, while the primary purpose of the wheel support frame pivot lever 52 is to facilitate movement of the wheel support frame 40a between the use and storage positions, it also enhances the structural rigidity of the base frame 12 as described above. Of course, many other types of securement devices may be used to secure the wheel support frame 40a in its use position, any of which may be substituted for the present invention, but it has been found that the wheel support frame pivot lever 52 provides a simple mechanical securement mechanism for the wheel support frame 40a.

When the wheel support frame pivot lever 52 is disengaged from arm securement bracket 54 and the securement pin 34 is removed from the pin-receiving hole 38, the wheel support frame 40a may be pivoted about rear frame pivot axle 49, as shown best in FIG. 2. This performs two functions simultaneously, one, moving the wheel support frame 40a from its use position to a transport position and, two, lowering the base frame 12 relative to the ground surface on which the wheel 60a is traveling due to the pivoting of wheel support frame 40a about rear frame pivot axle 49. This allows for full side loading access for the base frame 12 to facilitate loading heavy payloads without requiring the load to be lifted onto the trailer cart 10. Furthermore, heavy items such as big game animals or logs can be rolled over onto the cart 10, then the wheel support frames 40a and 40b may be returned to their use position with wheel support frame pivot lever 52 being used as a pivot lever to rotate the wheel support frame 40a about rear frame pivot axle 49 and subsequently being secured in arm securement bracket 54, thus raising the base frame 12 to its use position and greatly facilitating transport of the materials stored on the base frame 12.

FIG. 3 illustrates the configuration of the foldable frame trailer cart 10 of the present invention when folded for transport or storage. As shown in FIG. 3, the ball hitch connector 28 is mounted on the ball hinge 92 of an ATV 90 and the releasable plate hinge 24 of trailer tongue 20 has been released to permit the trailer tongue 20 to be folded in half with the rear section 22b of trailer tongue 20 being folded in excess of ninety degrees relative to the front section 22a. Likewise, releasable frame hinges 30a and 30b have been released to permit the right and left longitudinal frame beams 14a and 14b to be folded over one hundred eighty degrees to reduce the size of the base frame 12 to slightly more than half its original longitudinal length. Finally, it should be noted that the wheel support frames 40a and 40b do not need to be rotated about the rear frame pivot axle 49 in order to place the foldable frame trailer cart 10 in its transport or storage position, as shown in FIG. 3, although the wheel support frames 40a and 40b may be rotated about the rear frame pivot axle 49 should repositioning of the wheel support frames 40a and 40b relative to the generally rectangular base frame 12 be desirable.

It is to be understood that numerous additions, modifications and substitutions may be made to the foldable frame trailer cart 10 of the present invention which fall within the intended broad scope of the above description. For example, the size, shape and construction materials used in connection with the base frame 12 and wheel support frames 40a and 40b may be modified or changed so long as the intended functional features are neither degraded nor destroyed. Furthermore, although the present invention has been described as being generally designed for use in connection with ATVs, it should be noted that the foldable frame trailer cart 10 may be used with virtually any type of powered vehicle having a hitch to which the trailer cart 10 may be affixed. Therefore, use of the present invention with many different types of motorized vehicles such as trucks, automobiles, snowmobiles, motorcycles, or other such vehicles is contemplated. Also, although the spring-loaded pin securement device 32, the wheel support frame pivot lever 52 and the arm securement bracket 54 used for securing wheel support frames 40a and 40b in their use positions have been described in some particularity, it should be noted that many different types of securement devices and configurations may be used to releasably secure the wheel support frames 40a and 40b in their use positions, and such modifications are intended to be a part of this disclosure. Finally, it should be noted that the foldable frame trailer cart 10 may further include a pair of wheel guards 62a and 62b which, in the preferred embodiment, would be constructed of strap aluminum formed into a modified arc and welded onto the inner frame beams 42 of wheel support frames 40a and 40b adjacent the inner sides of wheels 60a and 60b to generally prevent items being supported on the base frame 12 from inadvertently contacting the wheels 60a and 60b.

There has therefore been shown and described a foldable frame trailer cart 10 which accomplishes all of its intended objectives.

We claim:

1. An improved foldable frame trailer cart comprising:
    a generally rectangular base frame having forward and rearward sections hingedly connected to one another;
    a trailer tongue mounted on and extending forwardly from said forward section of said generally rectangular base frame, said trailer tongue including a hinge operative to permit a rear portion of said trailer tongue to be pivoted relative to a front portion thereof;
    left and right rear wheels rotatably mounted within left and right wheel support frames;
    said left and right wheel support frames pivotably mounted on said rearward section of said generally rectangular base frame such that said left and right wheel support frames are pivotable relative to said generally rectangular base frame between a transport position and a use position; and
    a pin slidably mounted to one of said left and right wheel support frames, said pin moveable between a locked position in which said pin is received by an opening in said base frame to prevent said one of said left and right wheel support frames from pivoting with respect to said base frame, and an unlocked position in which said one of said left and right wheel support frames can pivot with respect to said base frame.

2. The improved foldable frame trailer cart of claim 1 wherein said hinge in said trailer tongue is a tongue hinge operative to permit said rear portion of said trailer tongue to be pivoted upwards and forwards relative to said forward portion of said trailer tongue.

3. The improved foldable frame trailer cart of claim 1 wherein said hinged connection between said forward and rearward sections of said generally rectangular base frame comprises at least one frame hinge operative to permit said rear section of said generally rectangular base frame to be folded over onto said forward section of said generally rectangular base frame.

4. The improved foldable frame trailer cart of claim 3 wherein said generally rectangular base frame further comprises left and right generally parallel longitudinal frame beams and said at least one frame hinge further comprises a pair of releasable frame hinges, one mounted on each of said longitudinal frame beams at approximately the midpoint thereof whereby said rear section of said base frame is foldable onto said forward section of said base frame.

5. The improved foldable frame trailer cart of claim 1 further comprising a rear frame pivot axle extending transversely across said rear section of said base frame.

6. The improved foldable frame trailer cart of claim 5 wherein said left and right wheel support frames are releasably pivotably mounted on said rear frame pivot axle such that said left and right wheel support frames are pivotable for transport and storage of said trailer cart once it is folded and for permitting said generally rectangular base frame to be lowered to ground level for loading and unloading of said generally rectangular base frame via rotation of said left and right wheel support frames upwards relative to said generally rectangular base frame.

7. The improved foldable frame trailer cart of claim 6 wherein said left and right rear wheels are positioned at least mostly above said generally rectangular base frame when in said transport position and are positioned at least mostly below said generally rectangular base frame when said left and right rear wheels are positioned in said use position.

8. An improved foldable frame trailer cart comprising:
a generally rectangular base frame having forward and rearward sections;
at least one frame hinge hingedly connecting said forward and rearward sections of said base frame, said at least one frame hinge operative to permit said rear section of said generally rectangular base frame to be folded over onto said forward section of said generally rectangular base frame;
a trailer tongue mounted on and extending forwardly from said forward section of said generally rectangular base frame, said trailer tongue including a tongue hinge operative to permit a rear portion of said trailer tongue to be pivoted upwards and forwards relative to a forward portion of said trailer tongue;
left and right rear wheels rotatably mounted within left and right wheel support frames;
said left and right wheel support frames pivotably mounted on said rearward section of said generally rectangular base frame such that said left and right wheel support frames are pivotable relative to said generally rectangular base frame between a transport position and a use position; and
a lever slidably mounted on one of said left and right wheel support frames, said lever moveable between a locked position in which said lever is secured to said base frame via a bracket to prevent said one of said left and right wheel support frames from pivoting with respect to said base frame, and an unlocked position in which said one of said left and right wheel support frames can pivot with respect to said base frame.

9. The improved foldable frame trailer cart of claim 8 wherein said generally rectangular base frame further comprises left and right generally parallel longitudinal frame beams and said at least one frame hinge further comprises a pair of releasable frame hinges, one mounted on each of said longitudinal frame beams at approximately the midpoint thereof whereby said rear section of said base frame is foldable onto said forward section of said base frame.

10. The improved foldable frame trailer cart of claim 8 further comprising a rear frame pivot axle extending transversely across said rear section of said base frame.

11. The improved foldable frame trailer cart of claim 10 wherein said left and right wheel support frames are releasably pivotably mounted on said rear frame pivot axle such that said left and right wheel support frames are pivotable for transport and storage of said trailer cart once it is folded and for permitting said generally rectangular base frame to be lowered to ground level for loading and unloading of said generally rectangular base frame via rotation of said left and right wheel support frames upwards relative to said generally rectangular base frame.

12. The improved foldable frame trailer cart of claim 11 wherein said left and right rear wheels are positioned at least mostly above said generally rectangular base frame when in said transport position and are positioned at least mostly below said generally rectangular base frame when said left and right rear wheels are positioned in said use position.

13. An improved foldable frame trailer cart comprising:
a base frame having forward and rearward sections;
at least one frame hinge hingedly connecting said forward and rearward sections of said base frame, said at least one frame hinge operative to permit said rear section of said generally rectangular base frame to be folded over onto said forward section of said base frame;
a trailer tongue mounted on and extending forwardly from said forward section of said base frame, said trailer tongue including a tongue hinge operative to permit a rear portion of said trailer tongue to be pivoted upwards and forwards relative to said a forward portion of said trailer tongue into a trailer transport position;
left and right rear wheels rotatably mounted within left and right wheel support frames;
said left and right wheel support frames releasably pivotably mounted on said rearward section of said base frame such that said left and right wheel support frames are pivotable relative to said base frame between a transport position and a use position; and
a lever slidably mounted on one of said left and right wheel support frames, said lever moveable between a locked position, in which said lever is secured to said base frame via a bracket and said lever extends over said frame hinge and a portion of each of said forward and rearward sections of said base frame to prevent said rearward and forward sections of said base frame from moving relative to each other, and an unlocked position in which said rearward and forward sections of said base frame can move relative to each other, wherein when said lever is in its locked position said lever prevents said one of said left and right wheel support frames from pivoting with respect to said base frame, and when said lever is in its unlocked position said one of said left and right wheel support frames can pivot with respect to said base frame.

14. The improved foldable frame trailer cart of claim 13, further comprising a pin slidably mounted to one of said left and right wheel support frames, said pin moveable between a locked position in which said pin is received by an opening in said base frame to prevent said one of said left and right wheel support frames from pivoting with respect to said base frame, and an unlocked position in which said one of said left and right wheel support frames can pivot with respect to said base frame.

15. The improved foldable frame trailer cart of claim 1, further comprising a lever slidably mounted on one of said left and right wheel support frames, said lever moveable between a locked position in which said lever is secured to said base frame via a bracket to prevent said one of said left and right wheel support frames from pivoting with respect to said base frame, and an unlocked position in which said one of said left and right wheel support frames can pivot with respect to said base frame.

16. The improved foldable frame trailer cart of claim 8, further comprising a pin slidably mounted to one of said left and right wheel support frames, said pin moveable between a locked position in which said pin is received by an opening in said base frame to prevent said one of said left and right wheel support frames from pivoting with respect to said base frame, and an unlocked position in which said one of said left and right wheel support frames can pivot with respect to said base frame.

* * * * *